Oct. 28, 1930.　T. J. STURTEVANT　1,779,993
AIR SEPARATOR
Filed Oct. 31, 1927　2 Sheets-Sheet 1
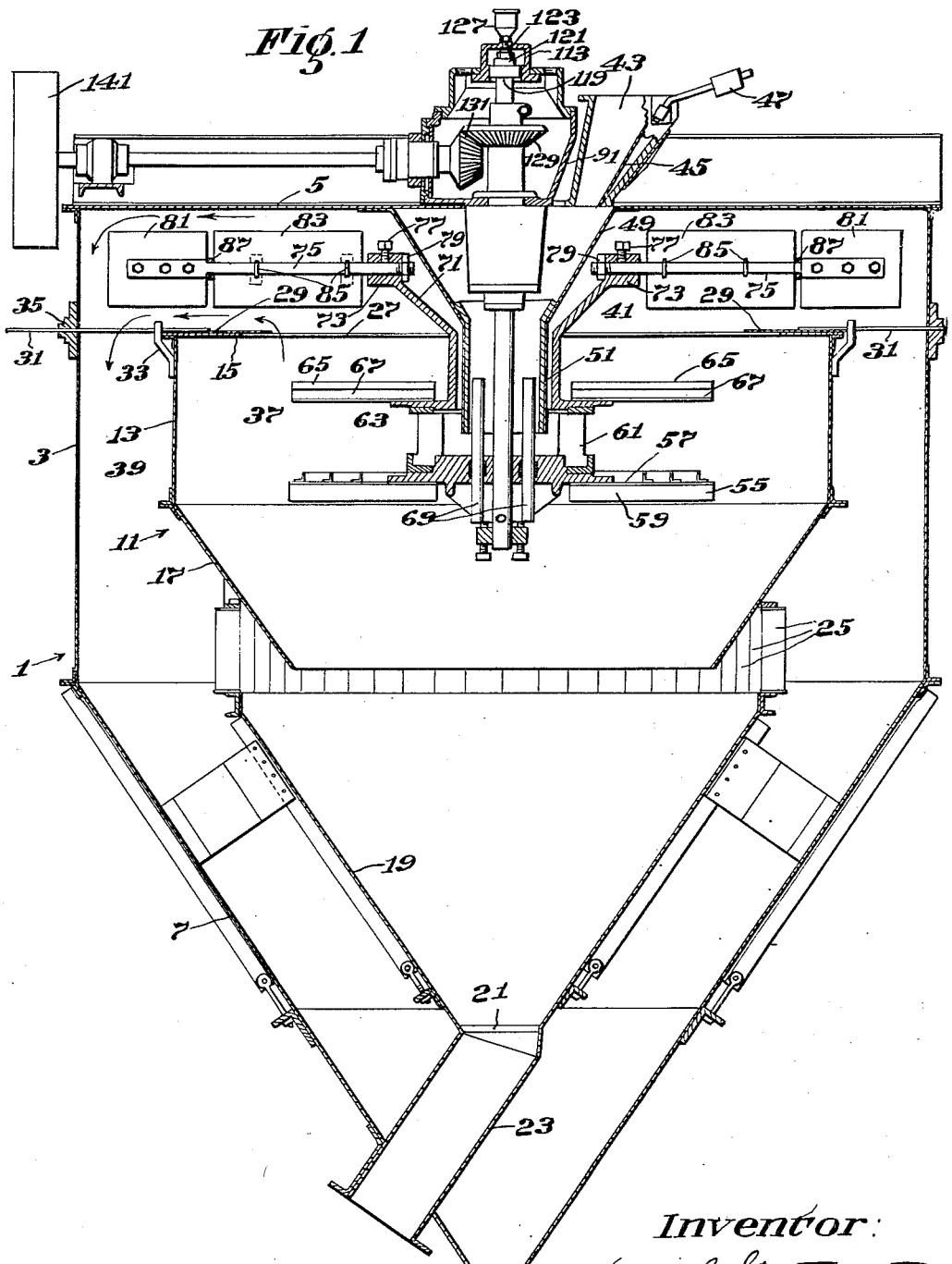

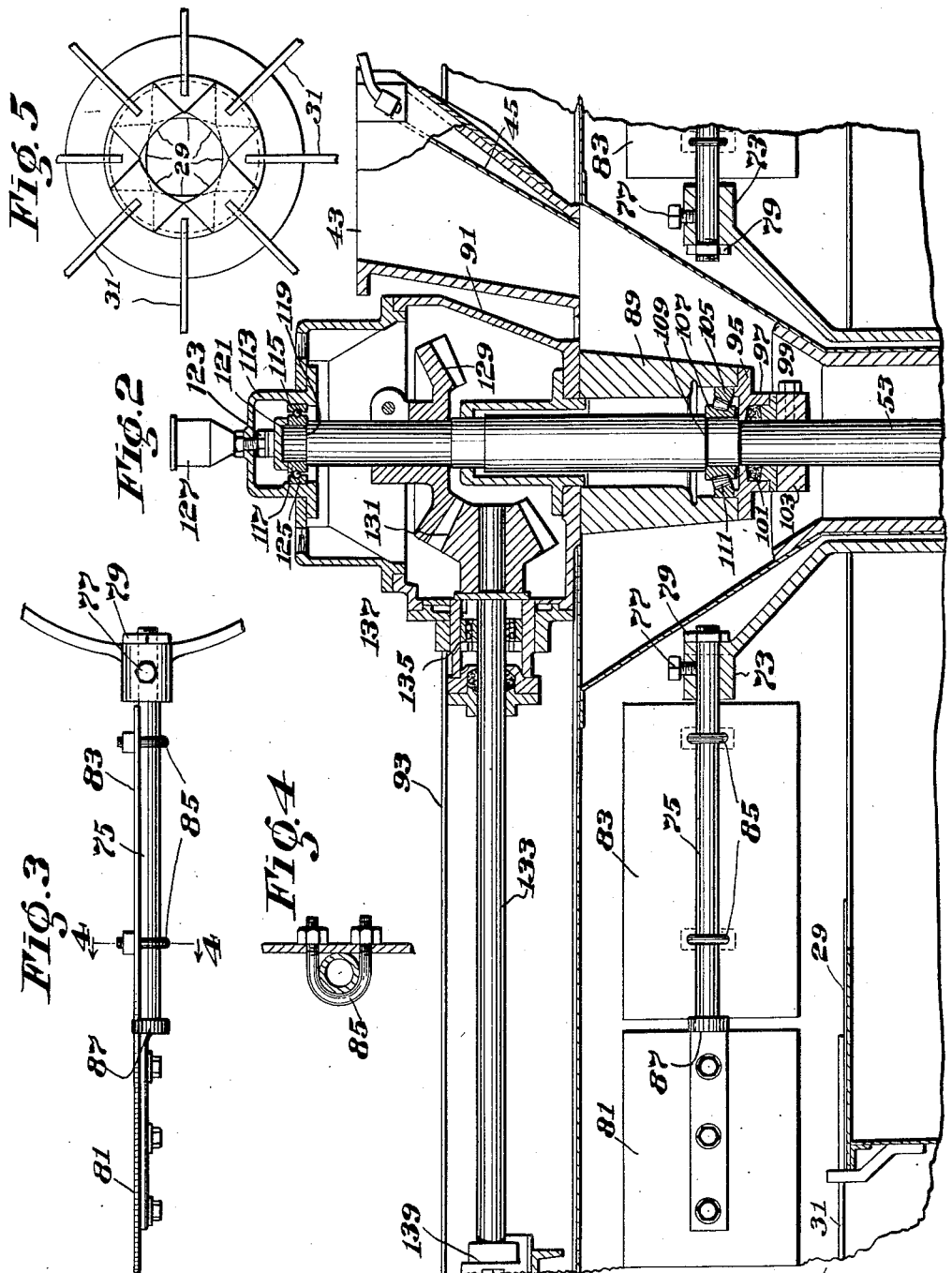

Patented Oct. 28, 1930

1,779,993

UNITED STATES PATENT OFFICE

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS

AIR SEPARATOR

Application filed October 31, 1927. Serial No. 229,840.

The invention to be hereinafter described relates to air separators for grading materials.

An air separator of this type comprises a separating chamber and a settling chamber through which an air current is caused to circulate. The air moves upward in the separating chamber and downward in the settling chamber. The materials to be graded are introduced into the separating chamber and are thrown outward by a rotary distributor into the path of the rising air current in the separating chamber. The lighter particles or fines are carried over into the settling chamber while the heavier particles or tailings gravitate down through the rising air current, the fines and tailings being separately discharged. The air is caused to circulate by a fan preferably located in a space above the separating chamber and communicating with both chambers.

Heretofore, difficulty has been experienced in efficiently separating lighter classes of materials. Attempt has been made to accomplish this by reducing the speed of rotation of the fan and the velocity of the air to avoid carrying coarser particles from the separating chamber over into the settling chamber, but it was found that efficient collection of the fines in the settling chamber was not obtained. A purpose of the present invention, therefore, is to provide means to reduce the strength of the air current issuing from the separating chamber as required to prevent heavier particles from passing into the settling chamber, and at the same time obtain efficient collection of the lighter particles.

To accomplish this, in the present instance, fan blades are provided which will have centrifugal effect sufficient to force the air outward and downward in the settling chamber and draw the air upward in the separating chamber, but some of the blades are located and arranged to check or retard the air rising in the separating chamber sufficiently to prevent the coarser particles from being carried over into the settling chamber.

Another purpose of the invention is to provide fan blades which may be adjusted to increase the velocity and strength of the air circulating through the chambers when coarser classes of materials are to be separated. The fan blades may be arranged and adjusted so that they will give the air current greater strength and velocity than obtainable by the ordinary centrifugal fan used in air separators, and without the necessity of increasing the speed of rotation of the fan.

The character of the invention will be best understood by reference to the following description of an embodiment thereof shown in the accompanying drawings, wherein:

Fig. 1 is a vertical section through the separator;

Fig. 2 on an enlarged scale is a vertical section through an upper portion of the separator;

Fig. 3 is a plan of one of the fan arms and the blades thereon;

Fig. 4 on an enlarged scale is a transverse section taken on line 4—4 of Fig. 3; and Fig. 5 is a plan of the valve at the top of the separating chamber.

Referring to the drawings, the separator shown therein as one embodiment of the invention, comprises an outer casing 1 (Fig. 1) having a drum 3 with a top 5. A conical shell 7 depends from the drum and has an outlet 9 at the lower end thereof.

Spaced from the outer casing is an inner casing 11 having a drum 13 with a top 15. A conical shell 17 depends from the drum. Within and spaced from the conical shell 7 is a conical shell 19 having an outlet 21 at the lower end thereof communicating with a discharge spout 23 which extends through the shell 7. The conical shells 17 and 19 are spaced vertically, and between them is an inlet in which are a series of vanes 25 having spaces between them.

The drum top 15 has an opening or outlet 27 which may be provided with a valve consisting of radially adjustable overlapping plates 29 (Fig. 5), each provided with a rod 31 extending through a guide 33 on the drum 13, and through a guide 35 on the drum 3. The construction is such that these plates may be adjusted radially inward and outward thereby to vary the size of the opening 27.

The inner casing 11 has a separating chamber 37 therein and between the inner and outer casings is a settling chamber 39. The tops of the inner and outer casings have a space 41 between them for receiving a fan to be described.

The materials to be graded are introduced into the separator through an upper hopper 43 provided with a flap valve 45 having an arm carrying a weight 47 which tends to hold the valve in closed position. Communicating with the upper hopper is a lower conical hopper 49 projecting down from the top of the outer casing through the space 41 and communicating with a neck 51 extending into the separating chamber.

Projecting down through the lower hopper and neck is a vertical shaft 53 carrying at the lower end thereof a rotary distributor 55 comprising a plate 57 and vanes or ribs 59 on the under side of the plate.

Mounted on and projecting up from the rotary distributor are studs 61, and secured thereto is the flange of a hub 63. Above the rotary distributor and secured to the hub flange is a baffle plate 65 having vanes or ribs 67. Projecting up from the distributor into the lower hopper neck 51, referred to, are stirrer blades 69.

Next will be described the fan for causing air to circulate in a circuit up through the separating chamber through the opening 27 through the space 41 into the settling chamber and back through the spaces between the vanes 25 into the separating chamber. The hub 63 extends upward through the opening 27 and has a conical portion 71 encircling and spaced from the lower hopper 49. This hub portion is provided with bosses 73 receiving the inner ends of the fan arms 75 held by set screws 77 in desired positions of rotative adjustment, for a purpose to be described. The arms are prevented from moving outward by nuts 79 threaded on the inner ends of the arms and engaging ends of the bosses. Secured to the outer end portions of these arms are blades 81. Between these blades and the bosses are blades 83 secured in desired positions of rotative adjustment on the arms by U-bolts 85. Washers 87 are on the arms and interposed between the blades 81 and 83.

The construction is such that the outer and inner blades may be relatively, rotatively adjusted. The adjustment of the outer set of blades is accomplished by turning the arms in the bosses and securing them by the set screws 77. The adjustment of the inner set of blades is accomplished by turning them on the arms and securing them by the U-bolts.

When it is desired to separate lighter classes of materials, the inner set of blades may be adjusted, for example, to positions at an angle of 45° to the vertical, so that these blades will act as a propeller to reduce the velocity of the air current locally in the circuit and tend to force the air downward in the direction of the axis of the fan. The adjustment may be such that the air current rising in and from the separating chamber will be checked or retarded sufficiently to prevent the lighter particles from being carried over into the settling chamber. The outer set of blades may be in vertical positions or they may be adjusted, for example, to positions at an angle of 45° from the vertical, and at angles of 90° with respect to the inner set of blades. When so disposed, the outer blades will act as a propeller and tend to force the air issuing from the fan containing space up toward the top of the settling chamber.

The construction of the fan is such that it may be adjusted so that its efficiency in circulating the air will be reduced without substantial reduction in the whirl of the air. The velocity of the air can be regulated by adjustment of the blades independently of the speed of rotation of the fan. The air will always have sufficient whirl in the settling chamber to cause the lighter particles in passing downward therethrough to move close to the outer casing, and thereby avoid returning through the spaces between the vanes into the separating chamber.

The vanes projecting down from the rotary distributor and the vanes projecting up from the baffle plate will promote whirl of the air in the separating chamber, and will tend to carry the heavier particles toward the wall of the separating chamber and into the space beneath the top of the separating chamber outward from the opening therein. The vanes of the baffle plate will strike and throw outward the heavier particles, but will not prevent the finer particles from being carried by the rising air current over into the settling chamber.

If it be desired to separate coarser classes of materials, the inner set of blades may be angularly adjusted so as to operate as a propeller to force and draw the air upward, and thereby increase the velocity of the rising air current. Also, the outer blades may be adjusted to force the air downward in the settling chamber with further increased velocity if desired. These blades may be variously adjusted according to conditions as required.

Next will be described the bearings and driving means for the vertical shaft. This means comprises a housing 89 projecting down into the upper hopper from a gear box 91 carried by channels 93 at the top of the outer casing. At the lower end of the housing 89 is a cap 95 having a hole through which the shaft passes. Projecting from the cap is a flange 97 receiving a gland 99 for holding packing 101 into tight engagement with the shaft. The gland may be secured by a ring 103 held by a set screw to the shaft.

In the housing is a lower end thrust bearing comprising an outer raceway 105 fitted into the housing and an inner raceway 107 on the shaft and having its upper edge in engagement with a circumferential shoulder 109 on the shaft. Between the raceways are tapered rollers 111, the inner raceway being formed to provide a groove for receiving the rollers.

The shaft is provided with an upper bearing in a head 113 on the gear box 91, said bearing comprising an outer raceway 115 slidable in the head, and an inner raceway 117 on the upper end of the shaft and having its lower edge engaging a circumferential shoulder 119 on the shaft. A cap 121 engages the upper edge of the inner raceway and is secured by a screw bolt 123 to the shaft. Between the raceways are balls 125, the raceways having grooves for receiving them.

The construction is such that the tapered roller bearing will hold the shaft up in the housing and resist both end and lateral thrust of the shaft. The upper ball bearing will resist lateral thrust of the shaft. The shaft may automatically adjust itself to compensate for wear on the tapered rollers and their raceways, such adjustment being permitted by sliding of the outer raceway 115 relatively to the head 113. At the top of the head a lubricant receiving cup 127 may be provided for lubricating the upper ball bearing.

To rotate the shaft, a bevel gear 129 is mounted on the shaft in the gear box and meshes with a bevel gear 131 mounted on an end of a horizontal shaft 133 journalled in a ball bearing 135 carried by a head 137 of the gear box, said shaft being also journalled in an outboard bearing 139 mounted on the channels 93, referred to. The outer end of the shaft is provided with a pulley 141 which may be driven from any suitable source of power. The construction is such that the vertical shaft will be rotated and with it the rotary distributor, the stirrer blades, the baffle plate and the fan which are all carried by the shaft.

The set of blades 81 and the set of blades 83 may be regarded as two fans, the former for causing the air to circulate through the chambers and whirl in the settling chamber, and the latter for regulating the air current leaving the separating chamber.

It will be understood that the invention is not limited to the specific embodiment shown, and that various deviations may be made therefrom without departing from the spirit and scope of the appended claims.

What is claimed is:—

1. An air separator for grading materials comprising, in combination, outer and inner casings having a settling chamber between them, said inner casing having a solid wall, a separating chamber therein and an inlet and an outlet communicating with the settling chamber, a fan above the separating chamber having blades for causing air to whirl and circulate in a circuit down through the settling chamber, through the inlet up through the separating chamber, and through the outlet to the settling chamber, means to introduce materials to be graded into the path of the air rising in the separating chamber, and a fan above the separating chamber having a radius less than the first-named fan and blades arranged for reducing locally in the circuit the velocity of the air rising in the separating chamber to prevent heavier particles from being carried by the circulating air over from the separating chamber into the settling chamber.

2. An air separator for grading materials comprising, in combination, outer and inner casings having a settling chamber between them, said inner casing having a solid wall, a separating chamber therein, and an inlet and an outlet communicating with the settling chamber, a fan above the separating chamber having blades for causing air to whirl and circulate in a circuit down through the settling chamber through the inlet, up through the separating chamber, and through the outlet to the settling chamber, a rotary distributor in the separating chamber having vanes for promoting whirl of the air in the separating chamber, means to deliver materials to be graded to the distributor, and a fan above the separating chamber having a radius less than the first-named fan and blades disposed at an angle for reducing locally in the circuit, the velocity of the air rising in the separating chamber, and promoting whirl of the air current leaving the separating chamber.

THOMAS J. STURTEVANT.